(12) United States Patent
Witt, Jr. et al.

(10) Patent No.: US 8,585,078 B1
(45) Date of Patent: Nov. 19, 2013

(54) TEAR SEAMS FOR INFLATABLE AIRBAG COVERS

(71) Applicant: Autoliv ASP, Inc., Ogden, UT (US)

(72) Inventors: John F. Witt, Jr., Clinton Township, MI (US); David W. Schneider, Waterford, MI (US); Michael Kutchey, Ortonville, MI (US); Jamie R. Fritz, Macomb, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/801,856

(22) Filed: Mar. 13, 2013

(51) Int. Cl.
*B60R 21/215* (2011.01)
*B60R 21/20* (2011.01)

(52) U.S. Cl.
USPC .................................. 280/728.3; 280/728.2

(58) Field of Classification Search
USPC .......................................... 280/728.2, 728.3

IPC ............................................ B60R 21/20,21/215
See application file for complete search history.

(56) References Cited

U.S. PATENT DOCUMENTS

| | | | | |
|---|---|---|---|---|
| 4,903,986 A * | 2/1990 | Cok et al. | ................... | 280/728.2 |
| 5,096,220 A * | 3/1992 | Nakajima | ................... | 280/728.3 |
| 5,374,079 A * | 12/1994 | Dukeshire et al. | .......... | 280/728.3 |
| 5,452,913 A * | 9/1995 | Hansen et al. | ............... | 280/728.1 |
| 5,568,936 A * | 10/1996 | Spilker et al. | .............. | 280/728.2 |
| 7,695,001 B2 * | 4/2010 | Adler et al. | ................ | 280/728.3 |
| 8,491,002 B2 | 7/2013 | Schneider et al. | | |
| 2010/0102541 A1 * | 4/2010 | Shimizu et al. | ............ | 280/728.3 |
| 2013/0113191 A1 * | 5/2013 | Schneider et al. | ......... | 280/728.3 |

* cited by examiner

*Primary Examiner* — Ruth Ilan
(74) *Attorney, Agent, or Firm* — Stoel Rives LLP

(57) ABSTRACT

Some airbag assemblies can include a housing, an airbag, and a cover. The cover can include a tear seam that is configured to break to permit the airbag to exit the housing. The tear seam can include discrete break columns at which the tear seam ruptures.

23 Claims, 15 Drawing Sheets

TEAR SEAMS FOR INFLATABLE AIRBAG COVERS

TECHNICAL FIELD

The present disclosure relates generally to the field of automotive protective systems. More specifically, the present disclosure relates to tear seams for covers of inflatable airbag assemblies and housings.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION

Figure 1A:
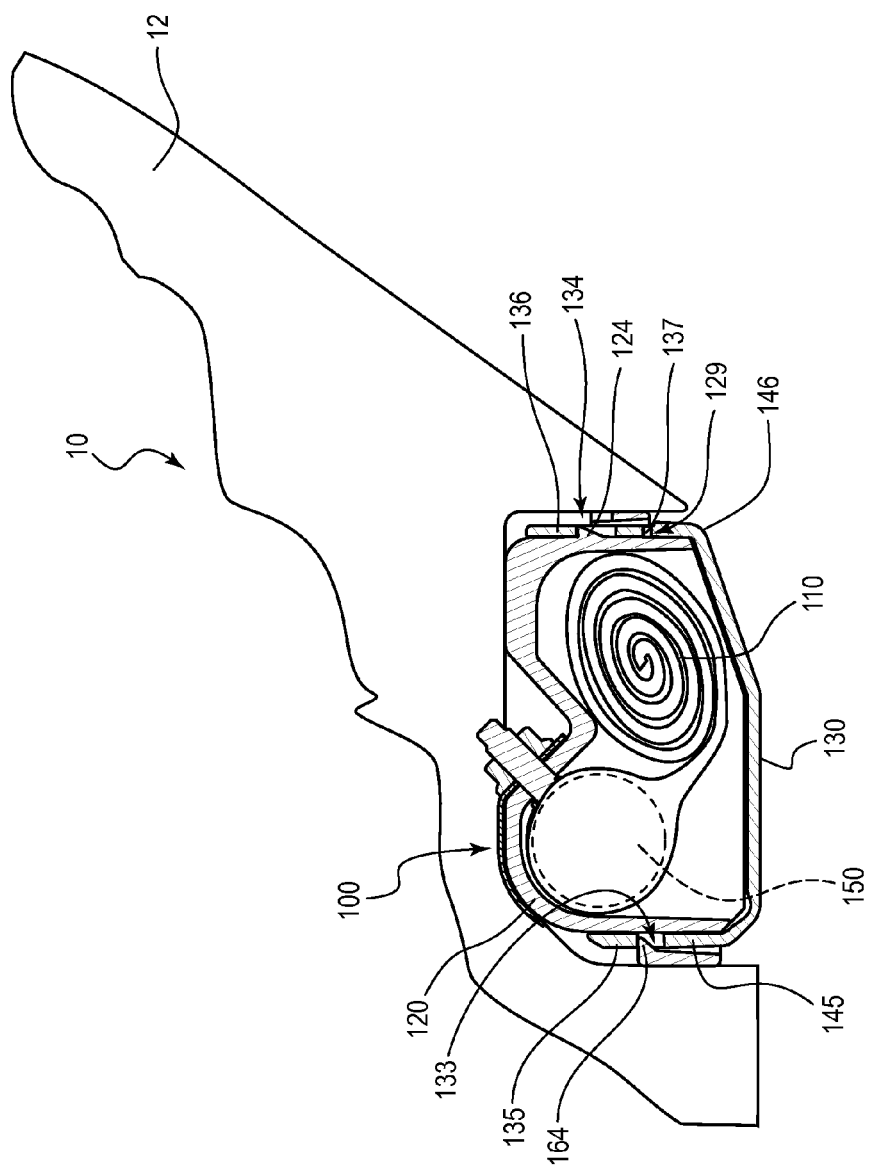
FIG. 1A is a side elevation view of an embodiment of an airbag assembly, wherein the airbag assembly is in a packaged state and installed in a vehicle.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to a knee airbag, inflatable curtain airbag, side airbag, overhead airbag, front airbag, or any other suitable airbag type.

During installation, the airbags may be rolled, folded, or both, and can be retained in the packaged configuration behind a cover. During a collision event, vehicle sensors can trigger the activation of an inflator, which rapidly fills the airbag with inflation gas. Thus the airbag rapidly changes confirmation from the packaged configuration to an expanded configuration.

With reference to FIGS. 1A-1D, in certain embodiments, an airbag assembly 100 includes a housing 120 within which an airbag cushion 110 can be positioned. A cover 130 can be coupled with the housing 120 to enclose the airbag cushion 110. The cover 130 can be coupled with the housing 120 via one or more tabs 136 that define windows 134, and the windows 134 can cooperate with hooks 124 defined by the housing to maintain the cover 130 coupled to the housing 120. The cover 130 can include a tear seam 129 along which one or more of the tabs 136 are configured to separate from the remainder of the cover 130. When the tear seam 129 is split or opened in such a manner, an opening 105 (see FIG. 1B) can be provided through which the airbag cushion 110 is permitted to expand out of the housing 120. In certain embodiments, when the airbag cushion 110 is deployed, at least a portion of the cover 130 is separated from the housing 120 to provide the opening, and another portion of the cover 130 remains coupled to the housing 120. For example, in the illustrated embodiment, the tear tabs 136 can remain coupled to the housing 120 after deployment, whereas the portion of the cover 130 that is originally coupled to the tear tabs 136 via the tear seam 129 can separate from the tear tabs 136 along the tear seam 129 to define the deployment opening (see FIG. 1B). Various advantageous configurations of the tear seam 129 are contemplated, as described more fully below.

With continued reference to FIGS. 1A-1D, side elevation views of the airbag assembly 100 at different stages of airbag deployment are shown. The airbag assembly 100 includes the airbag housing 120, the housing cover 130, and an inflator 150. In certain embodiments, airbag assembly 100 may be used in a low mount position such as a knee bolster 12 of a vehicle 10. When in a low mount position, cover 130 may be said to be horizontally oriented and/or parallel with a floor of the vehicle. In certain embodiments, the airbag assembly 100 may be an inflatable knee airbag assembly. Cover 130 may comprise at least one tear tab 136 having one or more individual, separate, or discrete break columns 137, which may also be referred to as breaking columns or breakaway columns. The cover 130 may further include a lip or end cap 146 portion at a rearward end of the cover 130 that is connected to the tear tabs 136 via the tear seam 129—specifically, the end cap 146 can be connected to the tear tabs 136 via the break columns 137. As further discussed below, the discrete break columns 137 can be configured to allow the tear tabs 136 to break away from the cover 130 during air bag deployment thereby providing the opening 105 in the cover 130 to allow the airbag cushion 110 to exit the housing 120 during inflation.

The cover 130 can include another lip or end cap 145 at a forward end of the assembly 100 that is coupled to one or more attachment tabs 135. The attachment tabs 135 can secure the forward end of the cover 130 to the forward end of the housing in a permanent fashion, as the attachment tabs 135 do not have tear seams that would permit ready separation of the attachment tabs 135 from the end cap 145. The attachment tabs 135 can define windows 133 that are secured to the housing 120 via hooks 124 defined by the housing 120. In other embodiments, the housing 120 may define one or more of the openings 133, 134 and one or more of the tabs 135, 136 of the cover 130 can define hooks or other suitable structures that are configured to couple with the openings 133, 134 of the housing to secure the tabs 135, 136 to the housing. Any other suitable coupling arrangement between the tabs 135, 136 and the housing 120 are possible.

Figure 1B:
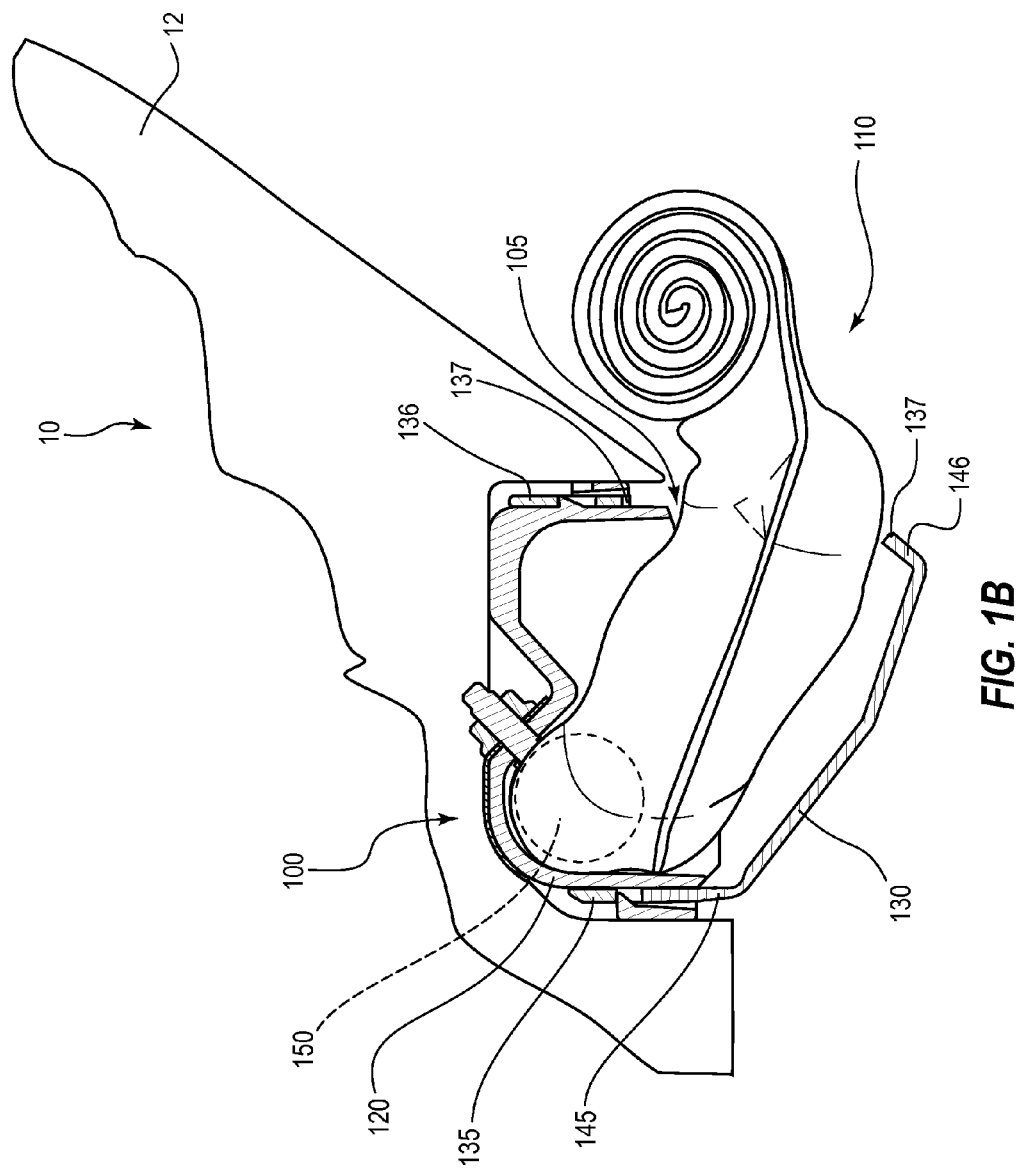
FIG. 1B is a side elevation view of the airbag assembly of FIG. 1A after the airbag has begun to be deployed.
Figure 1C:
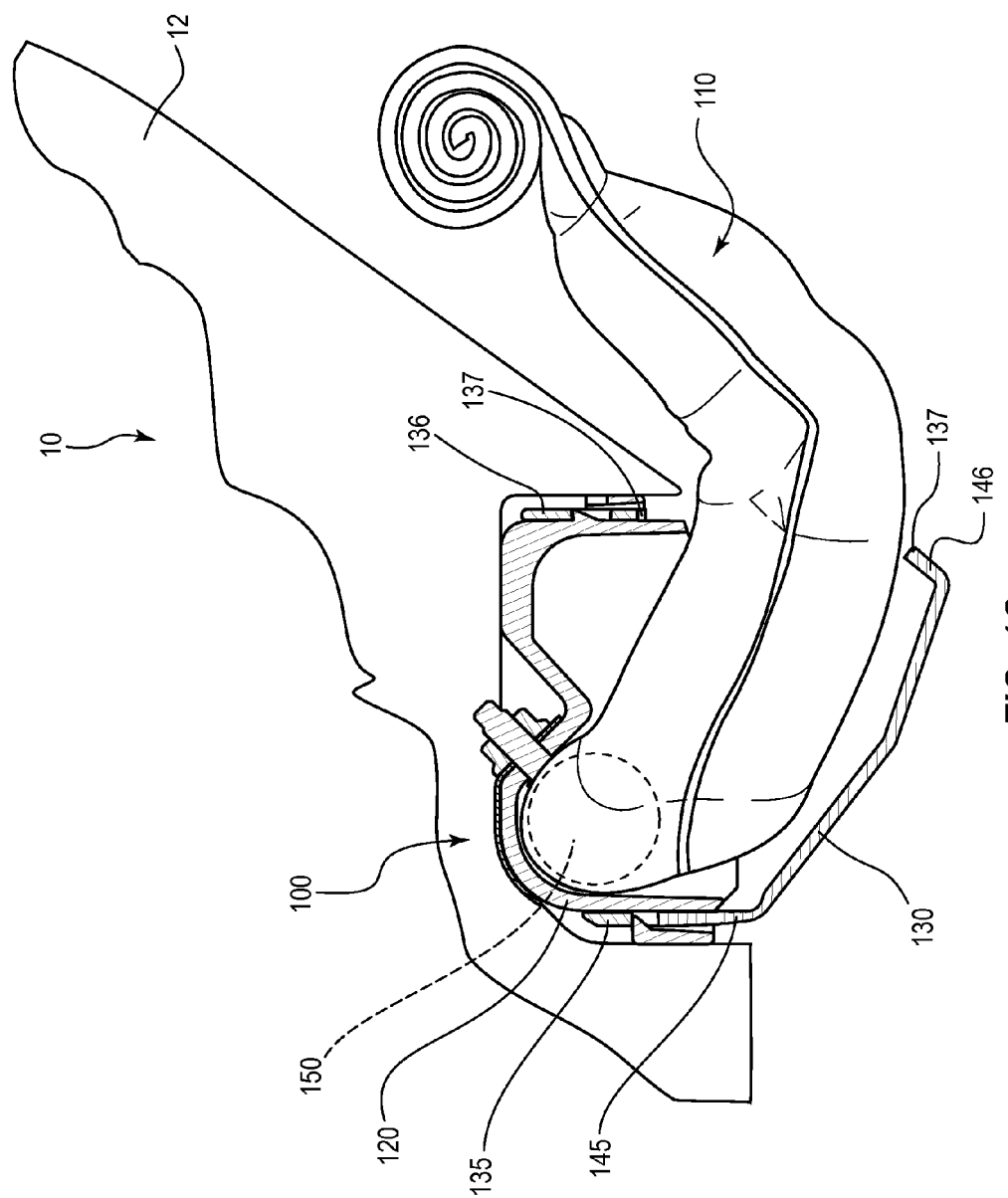
FIG. 1C is a side elevation view of the airbag assembly of FIG. 1B at a later time during airbag deployment.
Figure 1D:
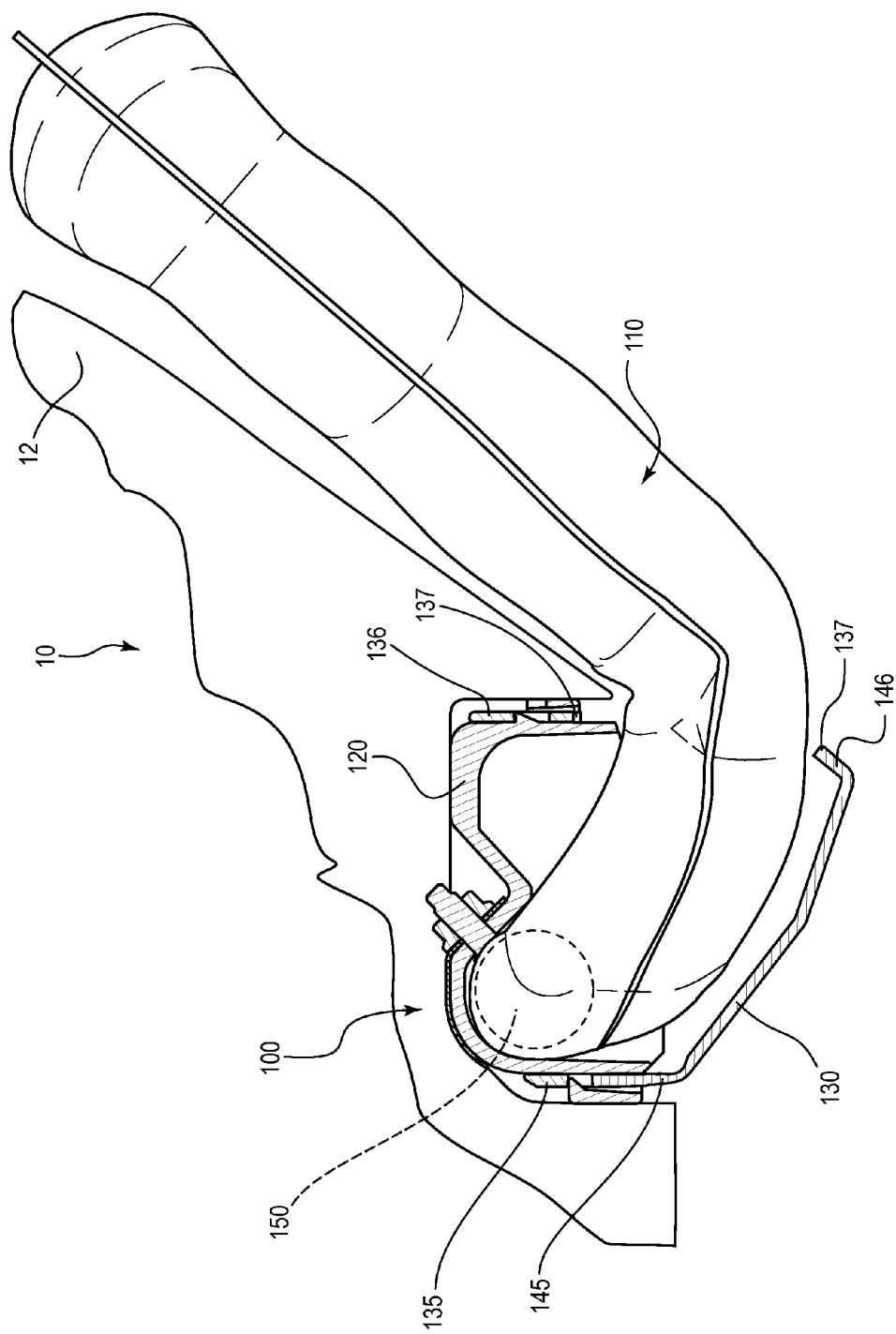
FIG. 1D is a side elevation view of the airbag assembly of FIG. 1C, wherein the airbag assembly is in an inflated, deployed configuration.

In FIG. 1A, airbag assembly 100 is in a packaged configuration, wherein airbag 110 is in a rolled and/or folded state and is retained within housing 120 via cover 130. In the depiction of FIG. 1B, inflator 150 has been activated and airbag 110 has begun to be inflated. The break columns 137 that attach the tear tab 136 to the remainder of the cover 130 (see FIG. 1A) have broken and a portion of airbag 110 has exited housing 120 in a car-rearward direction. In some embodiments, such as that shown by FIG. 1C, cover 130 may be configured to aid airbag 110 obtain an initial trajectory that may be described as being primarily car-rearward, rather than car-downward. FIG. 1D depicts airbag assembly 100 is in a deployed and inflated configuration. In some embodiments, during and after inflatable airbag 110 deployment, cover 130 may be configured to remain attached to housing 120 via attachment tab 135 that extends from end cap 145 of the cover 130. In other embodiments, during and/or after inflatable airbag 110 deployment, cover 130 may be configured to partially or completely tear away from housing 120. Tear tabs 136 may remain coupled to housing 120, although the end cap 146 may be severed from the tear 136 by the breaking of a series of break columns 137.

Although FIGS. 1A-1D depict a knee airbag having a specific deployment pattern, a variety of other types and configurations of inflatable airbags can be utilized. For example, the size, shape, and proportions of the airbag cushion may vary according to its use in different vehicles or different locations within a vehicle such that the airbag may comprise an inflatable curtain cushion, a rear passenger side airbag, a driver's airbag, and/or a front passenger airbag. Also, the airbag may comprise one or more of any suitable materials, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques. Also, the inflatable airbag may comprise one or more vents, which may be configured as discrete vents or dynamic vents.

Figure 2:
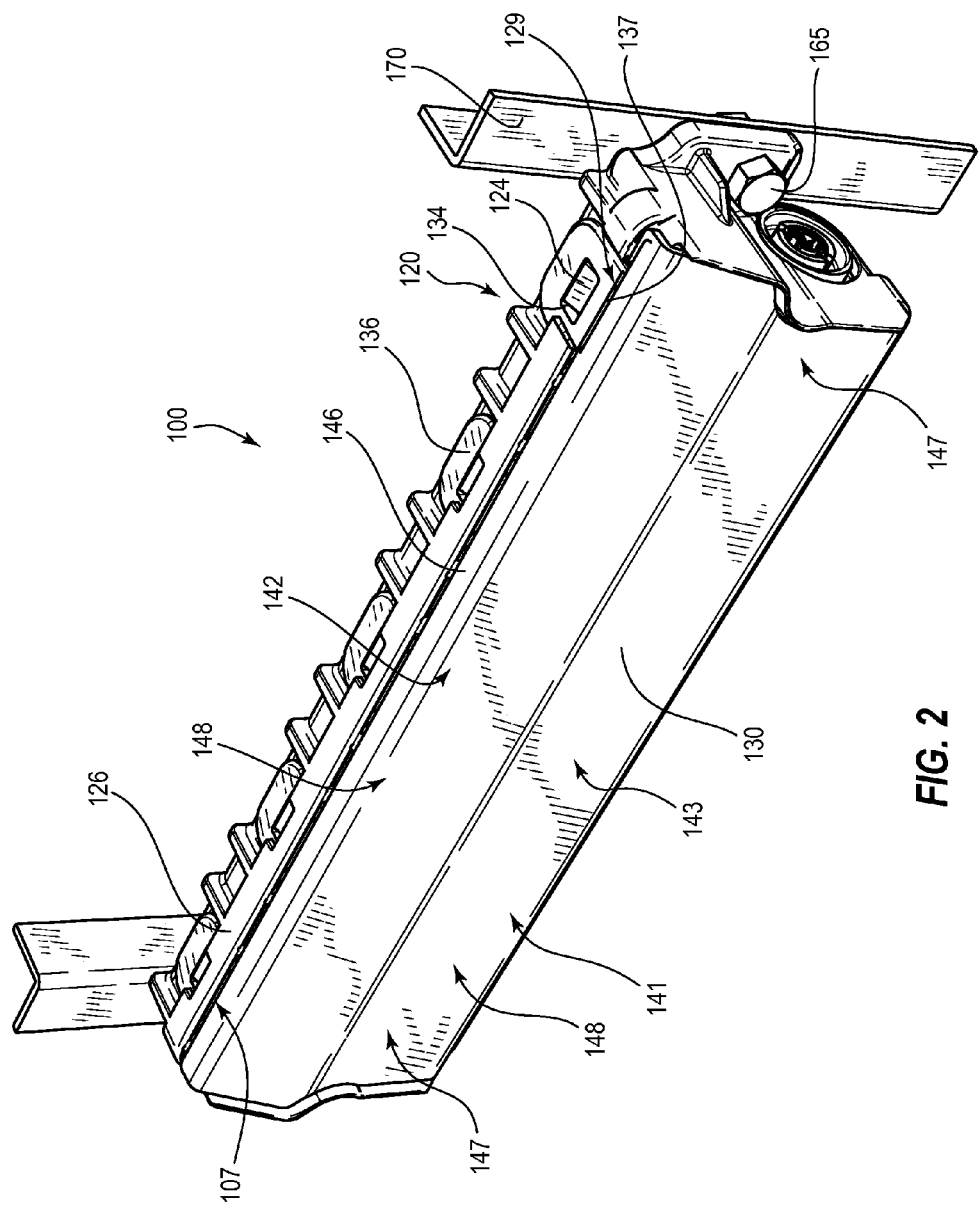
FIG. 2 is a front perspective view of the airbag assembly of FIG. 1A with a small portion thereof shown in cutaway, wherein the assembly is depicted as having been installed in a vehicle and at a time before the airbag has been deployed.
Figure 3:
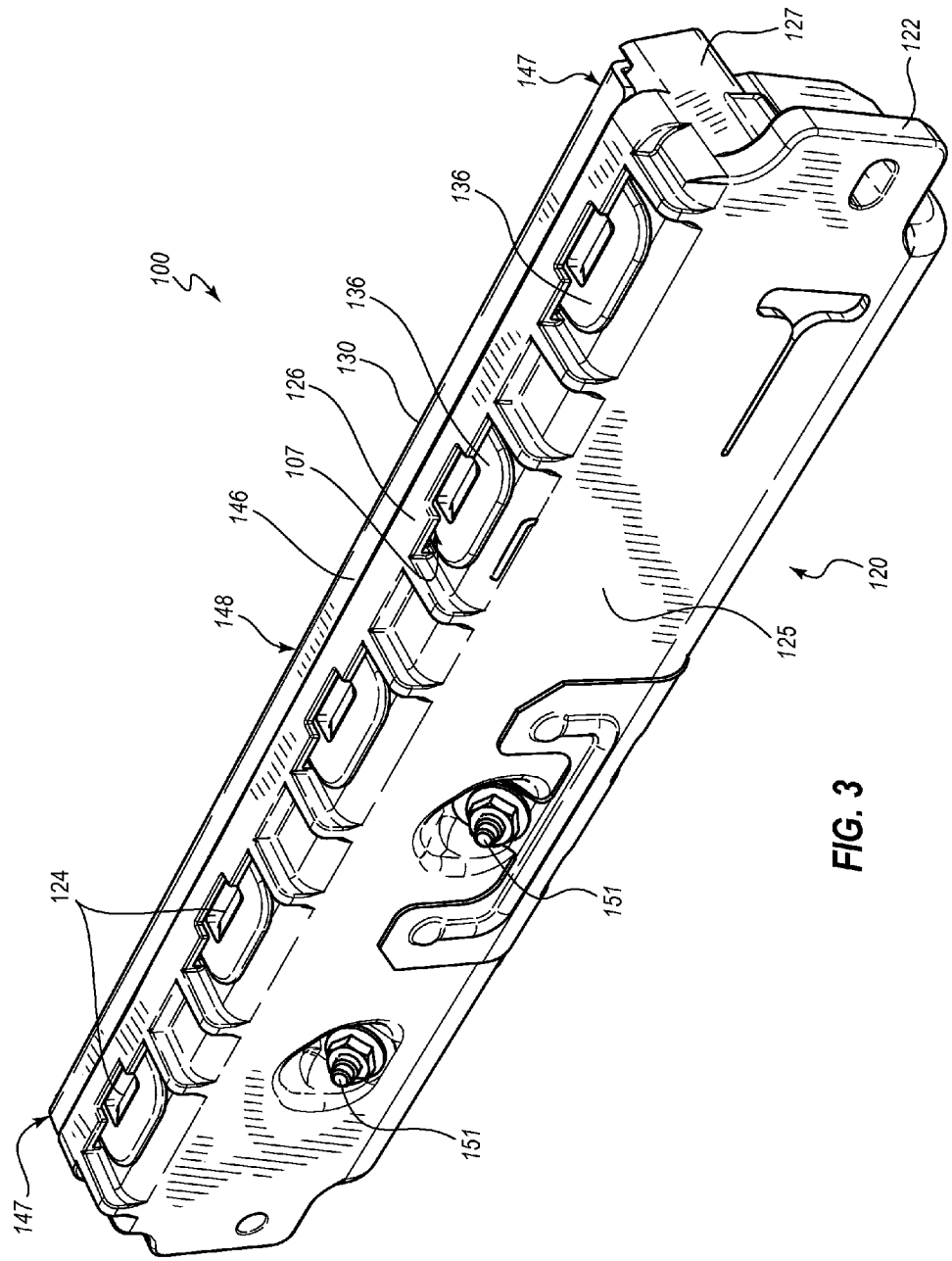
FIG. 3 is a rear perspective view of the airbag assembly of FIG. 2.

FIG. 2 and FIG. 3 are perspective views of opposing sides of the airbag assembly 100. In FIG. 2, assembly 100 is shown coupled to a vehicle structure 170 via mounting hardware 165. With reference to both FIG. 2 and FIG. 3, cover 130 may have two opposing laterally extending sides 147, which are also referred to herein as lateral sides, and two opposing longitudinally extending sides 148, which are also referred to herein as longitudinal sides. The end caps 145 and 146 can extend from each of the longitudinal sides 148. The end caps 145 and 146 permit the cover 130 to extend around the corresponding edges of the housing 120 to effectively close the housing 120 thereat. While the lateral sides 147 in the embodiment of a cover 130 shown in FIG. 2 and FIG. 3 do not have end caps, in certain other embodiments disclosed herein, one or more of lateral sides 147 may include end caps, attachment tabs, and/or tear tabs. In particular embodiments of the airbag disclosed herein, cover 130 may be further described as having a car-forward portion 141 and a car-rearward portion 142. A central region 143 of cover 130 may be described as an approximate or exact center of the cover along a longitudinal axis that is parallel to edges of the longitudinal sides 148 and perpendicular to edges of the lateral sides 147. The central region 143 may include at least a portion of each of the longitudinal sides 148 and the lateral sides 147, and may remain coupled to the housing 120 after deployment of the airbag cushion 110. In the illustrated embodiment, the cover 130 is substantially rectangular, and each of the car-forward and car-rearward portions 141, 142 is substantially planar. The illustrated car-forward and car-rearward portions 141, 142 are angled relative to each other, as shown, for example, in FIGS. 1A-1D.

With continued reference to FIGS. 2 and 3, the tear tabs 136 are located along the car-rearward portion 142 and attached to the cover 130 via the one or more break columns 137. The break columns 137 are positioned between the tear tabs 136 and the cover 130 such that they attach the tear tabs 136 to the end cap 146, which at least partially secures the cover 130 to the housing 120. The tear tabs 136 may be present along the entire longitudinal length of cover 130. In other or further embodiments, tear tabs 136 may be positioned along any desired portion of the cover 130. For example, one or more tear tabs 136, with break columns 137, may be positioned along any section of one or more of the longitudinal sides 148 and lateral sides 147 of the cover 130. In the illustrated embodiment, the tear tabs 136 are restricted to the car-rearward longitudinal side 148.

The housing 120 can include an attachment guide 126, which can define one or more openings 107 through which the tear tabs 136 can be inserted to couple the cover 130 to the housing 120. In the illustrated embodiment, the attachment guide 126 extends along a full longitudinal length of the housing 120 and defines a plurality of openings 107, with each opening 107 being configured to receive a separate tear tab 136. The attachment guide 126 can restrict movement over the tear tabs 136 in a direction that is outward from the sidewalls of the housing 120. Stated otherwise, the attachment guide 126 can retain the tear tabs 136 in a coupled state with the hooks 124, even during a deployment event as the break columns 137 burst, tear, or otherwise yield to permit separation of the tear tabs 136 from the end cap 146.

In FIG. 2, a small portion of the attachment guide 126 is not shown (e.g., a small portion of the right side of the housing 120 is shown in cutaway) to permit better viewing of the break columns 137 and the tear seam 129. The tear seam 129 can include the break columns 137 that are associated with multiple tear tabs 136. For example, the tear seam 129 can include the break columns 137 of each tear tab 136 and can extend longitudinally along at least a majority of or along substantially a full length of the end cap 146. Stated otherwise, each tear tab 136 can be joined to the end cap 146 via a portion of the tear seam 129, which extends along a full length of the end cap 146. However, it may also be said that each tear tab 136 is attached to the end cap 146 via a localized tear seam, and each such localized tear seam may include one or more break columns 137.

In some embodiments, at least a portion of the cover 130 may be coupled to housing 120 via hooks 124 on the housing that engage windows 134 defined by the tear tabs 136. Hooks 124 and windows 134 may be described as structures for coupling cover 130 to housing 120. As previously discussed, the attachment guide 126 of the housing can also assist in coupling the tear tabs 136 to the housing 120 and/or in maintaining the tear tabs 136 coupled to the housing 120. Housing 120 may define one or more apertures through which one or more mounting stems 151 of the inflator 150 can extend. The housing 120 can include mounting flanges 122 through which the mounting hardware 165 can be advanced to couple the housing 120 to the vehicle. The housing 120 can include various sidewalls, including a back wall 125 and a lateral sidewall 127, that cooperate to define an inner cavity. A variety of other types and configurations of airbag housings is possible. For example, in some embodiments, the housing 120 can define windows, such as the windows 134 of the illustrated cover 130, and the cover 130 can define hooks, such as the hooks 124 of the illustrated housing 120, that engage the windows. In some embodiments, the housing may comprise a stamped steel piece. In another embodiment, the housing may comprise steel and/or plastic.

Figure 4:
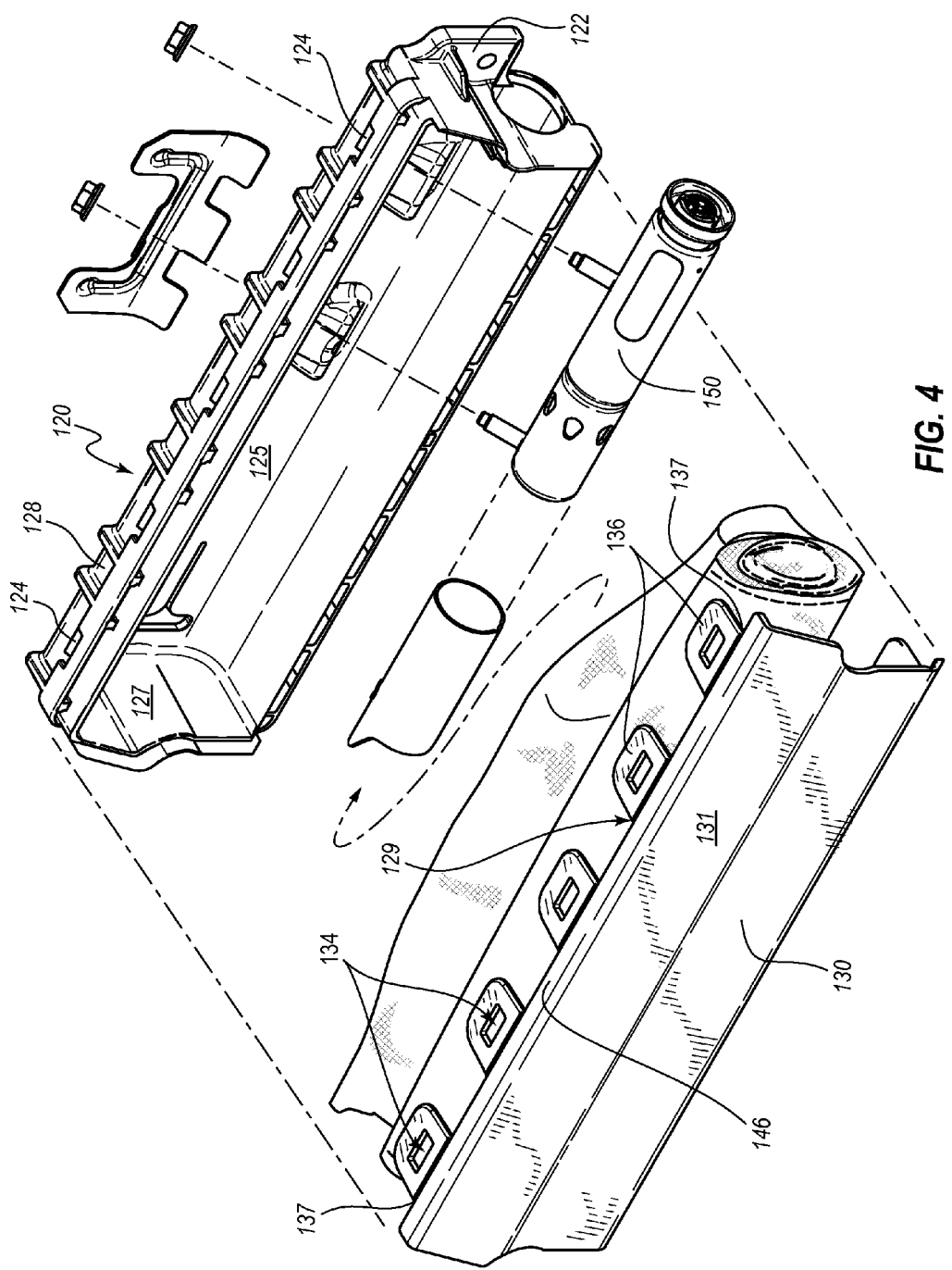
FIG. 4 is an exploded perspective view of the airbag assembly of FIG. 2.

FIG. 4 is a partially-exploded perspective view of airbag assembly 100, wherein cover 130 is shown separate from housing 120. Inflator 150 is positioned adjacent to an inside face of back wall 125. Hooks 124 are located on longitudinal sidewalls 128, against which an inside face of cover 130 may rest. Flanges 122 extend away from lateral sidewalls 127. Cover 130 comprises an outside face 131, windows 134, tear tabs 136, and break columns 137.

Hooks 124 may be regularly spaced on one or both longitudinal sidewalls 128 of housing 120. Windows 134 of cover 130 may be located on one or more tear tabs 136, which may extend from the end cap 146. Windows 134 may be regularly spaced in a manner that corresponds with hooks 124, such that in an assembled, or packaged configuration, the hooks 124 protrude through the windows 134, thereby retaining the cover 130 on the housing 120.

Figure 5A:
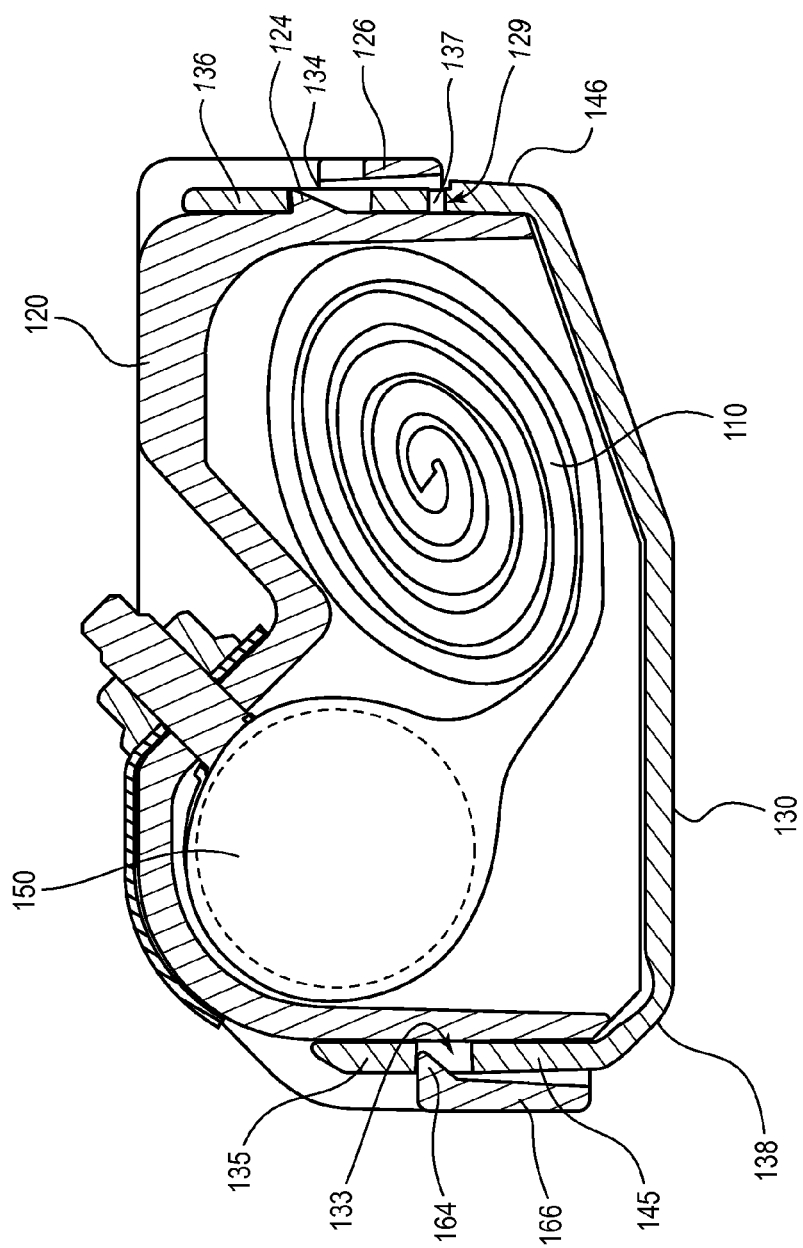
FIG. 5A is a cross-sectional view of the airbag assembly of FIG. 2.
Figure 5B:
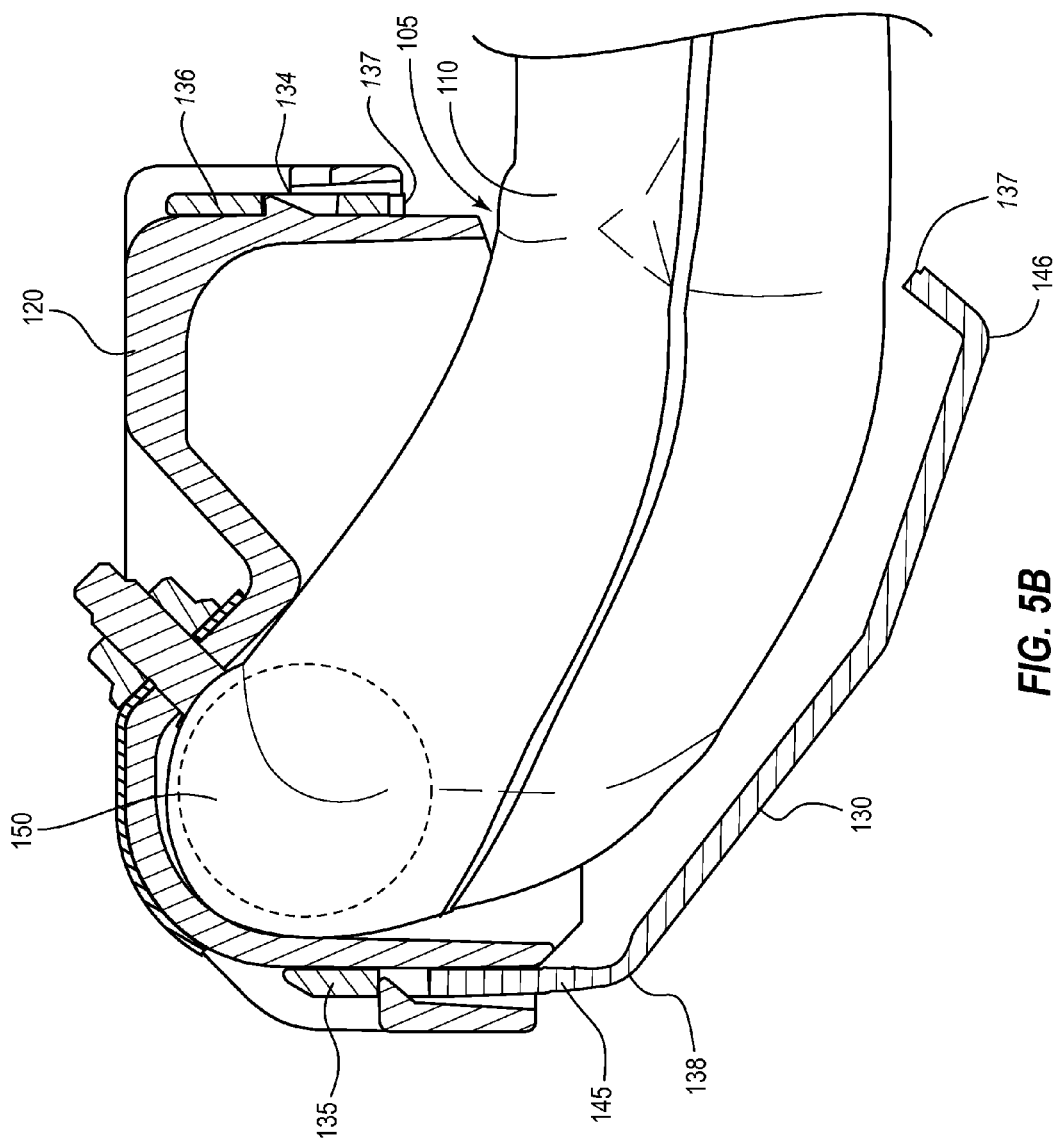
FIG. 5B is a cross-sectional view of the airbag assembly of FIG. 2, after the airbag has begun to be deployed.

FIGS. 5A-5B depict cross-sectional views of the airbag assembly 100, wherein in FIG. 5A, the assembly is in a packaged configuration, and in FIG. 5B, the assembly is in a deployed configuration. As previously discussed, cover 130 comprises a car-forward end cap 145 that is permanently coupled with one or more attachment tabs 135. Cover 130 further includes a series of tear tabs 136, each of which defines a window 134 and is attached to the end cap 146 via one or more discrete break columns 137. More generally, the tear tabs 136 are joined to the end cap 145 via a tear seam 129 that includes the break columns 137. In the packaged configuration, cover 130 may be coupled to housing 120 at both end cap 145 and end cap 146. In the deployed configuration of the embodiment shown by FIGS. 5A-5B, the tear tabs 136 separate from the housing 120 at the discrete break columns 137 such that the end cap 146 becomes uncoupled from housing 120 to define the opening 105. In some embodiments, the cover 130 includes a hinge 138 (e.g., a living hinge or merely a portion of the cover at which rotation is permitted), and that cover 130 can rotate about the hinge 138 during deployment.

As shown in FIG. 5A, the housing 120 may include an attachment guide 166 at the car-forward end thereof. The attachment guide 166 may resemble the attachment guide 126 at the car-rearward end of the housing 120, and may assist in maintaining the one or more attachment tabs 135 coupled to the housing 120 during an entirety of a deployment event. In the illustrated embodiment, the attachment guide 126 defines hooks 164 that engage the openings 133 of the attachment tabs 135. The hooks 164 are thus inwardly directed, relative to the housing 120, whereas the hooks 124 are outwardly directed, relative to the housing 120.

Figure 6:
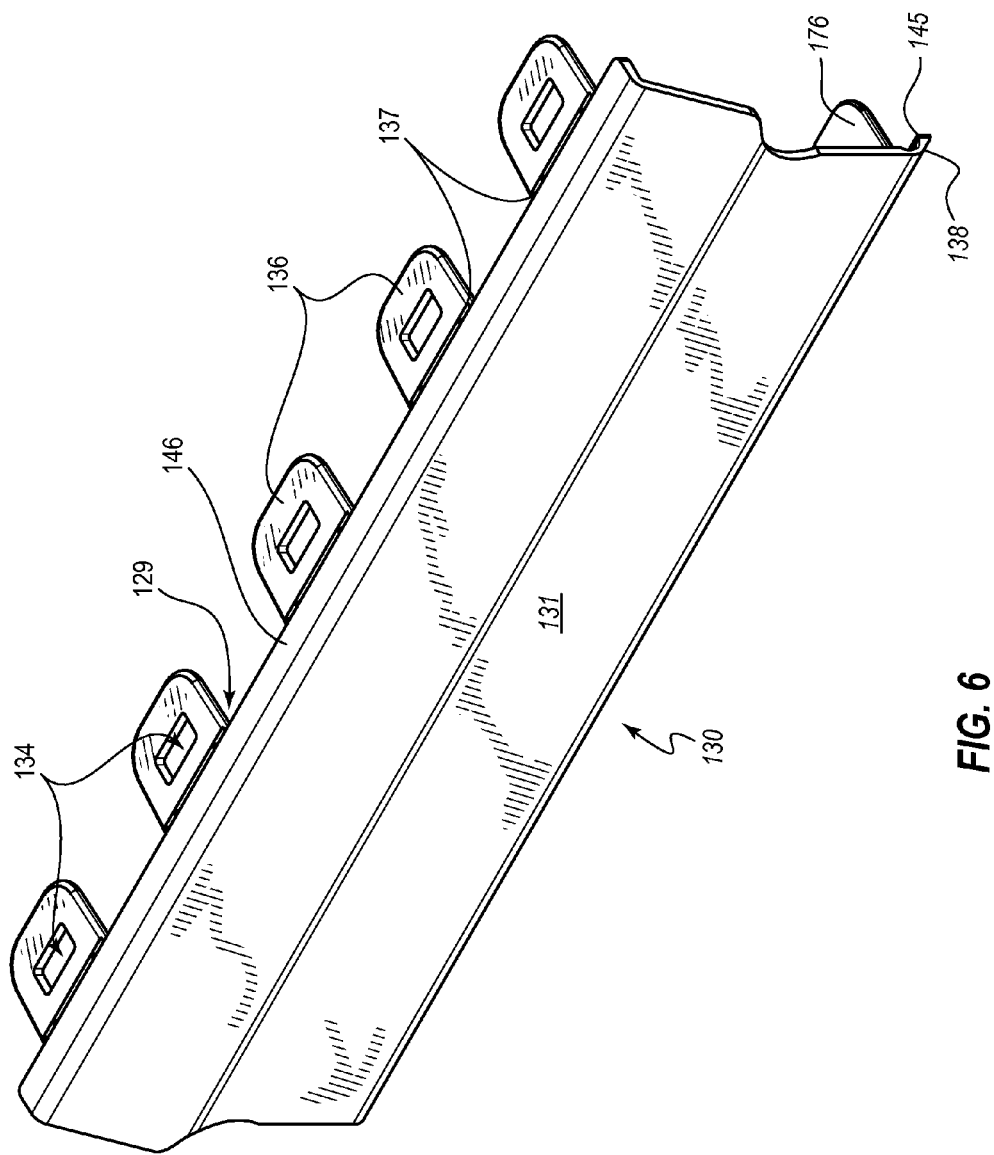
FIG. 6 is a perspective view of an outer surface of an embodiment of an embodiment of a cover that is compatible with the airbag assembly of FIG. 2.
Figure 7:
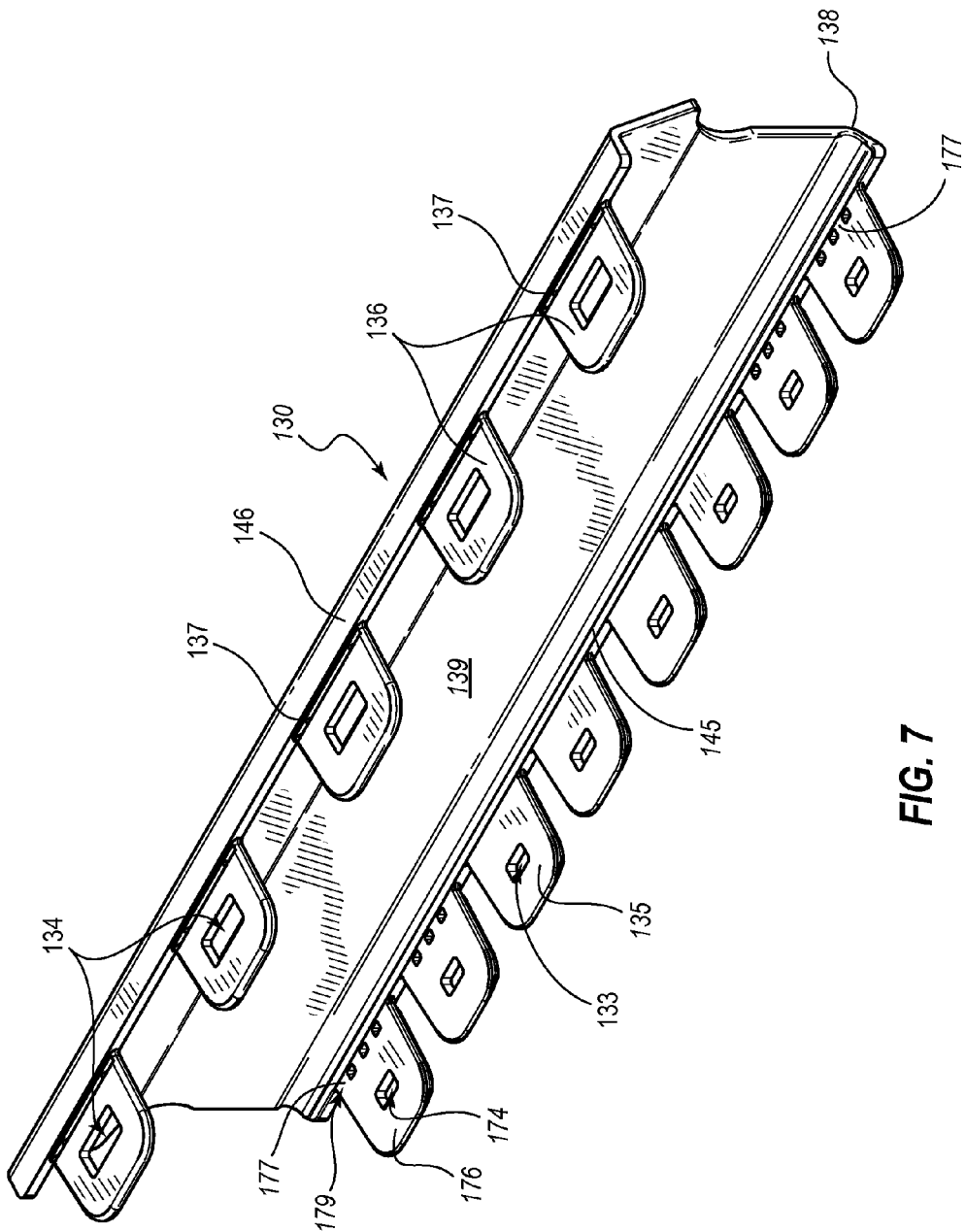
FIG. 7 is a perspective view of an interior surface of the cover of FIG. 6.

FIGS. 6 and 7 are oppositely directed perspective views of the cover 130, which includes the longitudinally extending end caps 145, 146, but which does not include laterally extending end caps (e.g., at the shorter laterally extending sides of the cover 130). As discussed below with respect to FIG. 12, other embodiments of covers may include lateral end caps. An external face 131 of the cover 130 is shown in FIG. 6 and an internal face 139 of the cover 130 is shown in FIG. 7.

As shown in FIG. 7, the illustrated embodiment of the cover 130 includes five tear tabs 136, which are equally spaced along a full length of the end cap 146. The cover 130 further includes four attachment tabs 135, which only extend along a central portion of the end cap 145. Each attachment tab 135 is narrower than the tear tabs 136. Each attachment tab 135 is identical to the remaining attachment tabs 135, other than with respect to the position of the attachment tabs 135. Similarly, each tear tab 136 is identical to the remaining tear tabs 136, other than with respect to the position of the tear tabs 136.

The cover 130 further includes tear tabs 176 that are attached to the end cap 145 at either longitudinal end of the cover 130. In the illustrated embodiment, the cover 130 includes four tear tabs 176, with two tear tabs 176 at each longitudinal end. Each tear tab 176 can define an opening 174 via which the tear tab 176 can be secured to the housing 120 via a hook 164 (see FIG. 5A) in manners such as described above. Further, each tear tab 176 can be attached to the end cap 145 via a tear seam 179, which can include a plurality of break columns 177. In some embodiments, the number and/or configuration of the break columns 177 that attach each tear tab 176 to the end cap 145 can vary from the number and/or configuration of the break columns 137 that attach each tear tab 136 to the end cap 146. Accordingly, in some embodiments, the breakaway characteristics of the tear tabs 136, 176 can differ from each other. Stated otherwise, in various embodiments, the tearing properties of the tear seams 129, 179 can differ from each other. In some embodiments, the tear tabs 136 can be separated from the end cap 146 more easily than the tear tabs 176 can be separated from the end cap 145. Stated otherwise, more force may be required to break the tear seam 179 than is required to break the tear seam 129. The number, cross-sectional shape, length, width, and/or other properties of the break columns 137, 177 may be adjusted as desired to achieve the desired breakaway characteristics of the cover 130. For example, in some embodiments, the tear tabs 136 may break away more easily, and thus may open up during initial stages of deployment to permit the airbag cushion 110 to initially exit from the housing in a generally car-rearward direction, and after additional inflation of the airbag cushion 110, as pressure builds within the airbag cushion 110, the tear tabs 176 may subsequently break (e.g., as a pressure relief) to permit further detachment of the cover 130 and provide a larger opening through which the airbag cushion 110 extends.

In other embodiments, the cover 130 may only include tear tabs at the car-rearward end of the housing 120. For example, in some embodiments, the tear tabs 176 may be replaced with additional attachment tabs 135 that are configured to remain permanently secured to the end cap 145. Other suitable arrangements and combinations of one or more of the tear tabs 136, 176 and the attachment tabs 135 are possible, and these combinations may be selected to achieve a desired deployment sequence or other deployment characteristic of the airbag cushion 110. Other or further variations of the cover 130 are possible. For example, the relative size, shape, and configuration of the airbag housing cover may vary from the depictions of cover 130.

The cover 130 may be formed of any suitable material, such as any suitable plastic (e.g., thermoplastic elastomers made from polypropylene, polyethylene, etc.). The cover 130 may be formed via any suitable manufacturing process. In some embodiments, the cover 130 comprises a unitary molded or extruded piece. During formation of the cover 130, the cover material is readily able to flow through openings in the molds between the regions of the mold at which the central portion 143 and the peripheral portions 147, 148 (see FIG. 2) of the cover 130 are formed and the regions of the mold at which the tear tabs 136 are formed. Material that is positioned within these openings ultimately results in the break columns 137. Accordingly, the molds may have any suitable shape to provide break columns 137 with the desired cross-sectional properties. For example, the molds may be negatives of the cross-sectional views shown in FIGS. 9-11, as discussed further below. The molds can be used repeatedly to form consistently sized and shaped break columns 137, and hence, to form tear seams 129 that break within a consistent and narrow range of rupture forces.

Such arrangements thus may vary from more traditional tear seams that have a continuous line of narrow material. In such traditional tear seams, molds may accumulate material over time that narrows, and thus weakens, portions of the tear seam. Accordingly, it may be difficult to produce consistent tear seams via the molds or other equipment over the life of those molds or other equipment. That is, rupture characteristics of tear seams produced via traditional methods can result in a high degree of variability. It may also be difficult to reduce a thickness of a tear seam for similar reasons. For example, the thinner a tear seam is desired to be, the more difficult it may be to ensure that material is evenly distributed through a mold, particularly in the region of the tear seam. The smaller openings in the molds may restrict material flow through the tear seam region and/or may introduce knit lines in the cover. Further, inspection of such traditional tear seams can also be a complicated and time consuming process, as numerous points of inspection of the continuous tear seam may be used to ensure that a thickness of the tear seam is constant, or that the tear seam otherwise follows a desired thickness profile, along a full length of the tear seam.

Embodiments disclosed herein can address, ameliorate, and/or resolve one or more of the foregoing drawbacks of traditional tear seams. For example, certain embodiments of the tear seam 129 may be easier to inspect, as relatively few break columns 137 may be present. In some instances, a thickness of each break column 137 may be measured via any suitable inspection equipment (e.g., calipers) to inspect the quality of the cover and ensure that it is within a desired range of performance characteristics. Moreover, visual inspection of the break columns 137 may also be easier, as mere rotation of the cover 130 can permit viewing of an entirety of each break column 137, in some embodiments. Further, in some embodiments, molds used to form the break columns 137 can be used repeatedly to form consistently sized and shaped break columns 137, and hence, to form tear seams 129 that break within a consistent and narrow range of rupture forces, as discussed above. The break columns 137 may also permit the formation of thinner tear seams and/or tear seams that are capable of rupturing at lower forces.

In other embodiments, the tear tabs 136 and/or the break columns 137 may be formed or altered after formation (e.g., post-extrusion) of the cover 130, e.g., via milling, die cutting, or stamping. Similarly, the windows 134 may be formed in any suitable manner after formation of the cover 130, e.g., via die cutting.

Figure 8A:
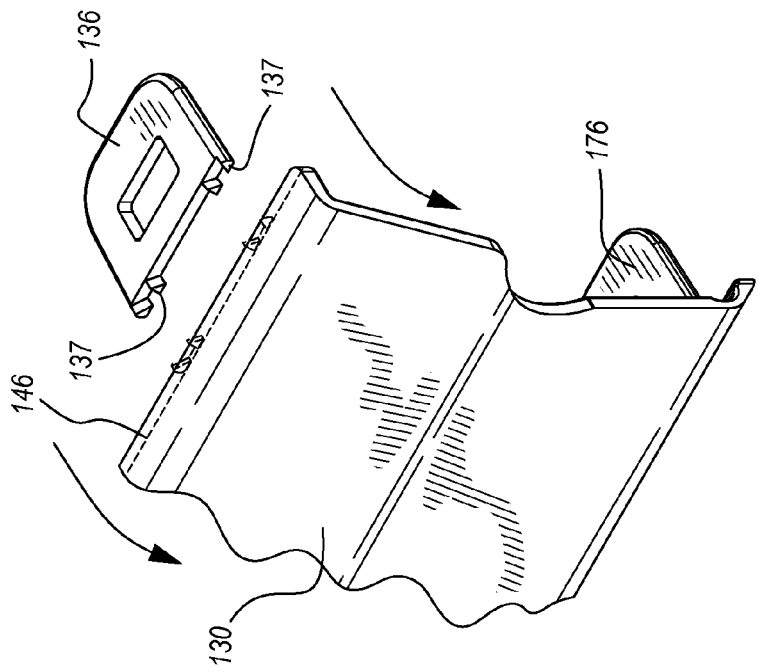
FIG. 8A is an enlarged perspective view of a portion of the cover of FIG. 6 showing a tear seam that includes discrete break columns.
Figure 8B:
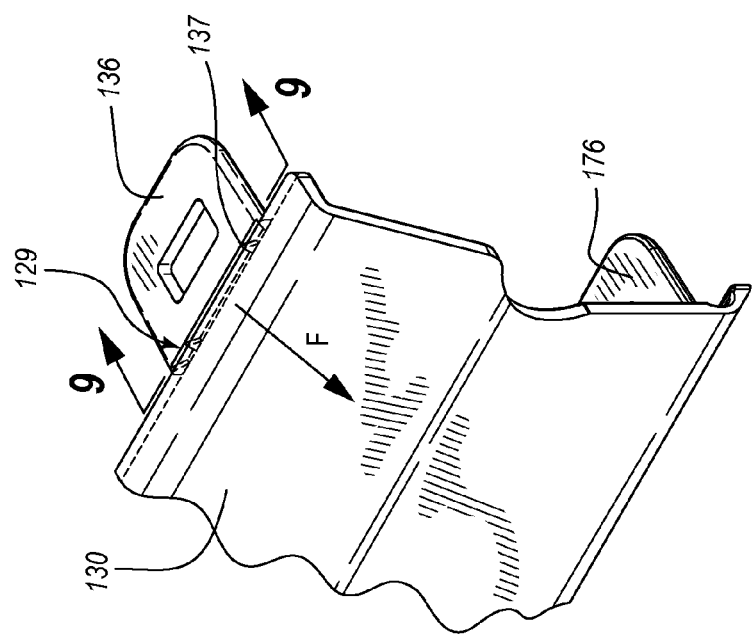
FIG. 8B is another enlarged perspective view of the cover of FIG. 8A after a tear tab with discrete break columns has detached from a remainder of the cover at the tear seam.

FIGS. 8A and 8B are enlarged perspective views of the cover 130 showing the tear tab 136 and break columns 137. The break columns 137 are configured to control the separation of the cover 130 from the tear tabs 136 and the housing during airbag deployment. In the illustrated embodiment, the tear tab 136 is attached to the cover 130 with break columns 137 extending from the bottom edge of the tear tab 136. Certain embodiments of the tear tab 136 may include one or more break columns 137 with one or more cross-sectional shapes, sizes, and areas. For example, the tear tab 136 may be attached to the end cap 146 via no fewer than 1, 2, 3, 4, 5, 6, 7, 8, 9, or 10 break columns 137. In further embodiments, one or more of the break columns 137 can extend along a longitudinal axis and can have a cross-sectional shape in a plane that is perpendicular to the longitudinal axis that is triangular, square, circular, trapezoidal, etc. Various properties of the break columns 137 can be adjusted or preselected to achieve a desired rupture pattern and/or tear strength of the tear seam 129. For example, one or more of the spacing, height, and width, and/or the cross-sectional size, shape, and/or area, and/or the orientation (e.g., the rotational orientation about a longitudinal axis) of the break columns 137 may be adjusted or preselected to achieve a desired tensile strength, sheer strength, and/or peel strength of the tear seam 129. The dimensions of the break columns 137 may also be modified to control tear tab end loading.

FIG. 8B illustrates the tear tab 136 having been separated from a neighboring portion of the cover 130—namely, the end cap 146 in the illustrated embodiment—due to rupturing, splitting, tearing, or any other suitable form of breakage of the break columns 137 due to a force F exerted on the cover 130, such as during deployment of the airbag cushion 110. As previously discussed, the tear tab 136 can remain coupled to the housing 120 during deployment, and a larger portion of the cover 130 may be pushed outwardly away from the housing 120.

In the embodiment shown in FIGS. 8A and 8B, the tear tab 136 is attached to the cover via four triangular break columns 137. As further discussed below, adjacent break columns 137 may have openings between them that extend through a full thickness of the cover 130. In the illustrated embodiment, a central opening is larger than openings between the outermost pairings of break columns 137. As previously discussed, in some embodiments, the break columns 137 may be formed during the process of molding or extruding the cover 130 and may be made of the same material as the cover 130 and may be continuous with the tear tab 136 and the cover 130. In other embodiments, the break columns 137 may be formed by milling, machining, or stamping. In further embodiments, the break columns 137 may be formed as part of the cover 130 and then attached with adhesive or welding to the tear tab 136. In other embodiments, the break columns 137 may be formed as part of the tear tab 136 and then attached with adhesive or welding to the cover 130.

Figure 9:
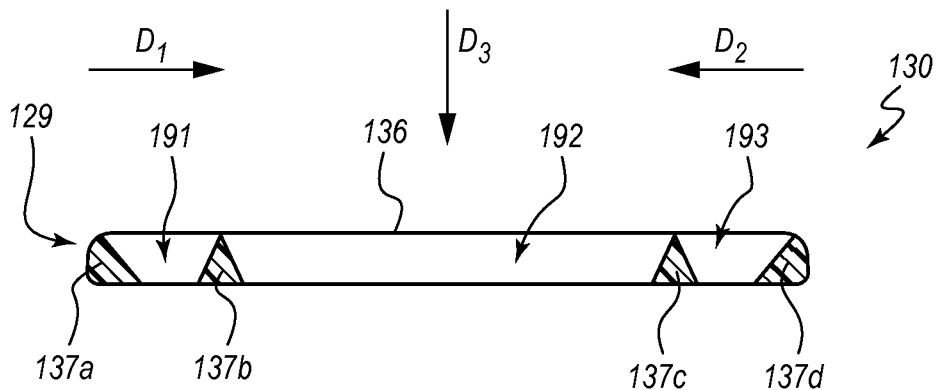
FIG. 9 is a cross-sectional view of a portion of the tear seam of FIG. 8A taken along the view line 9-9 in FIG. 8A.
Figure 10:
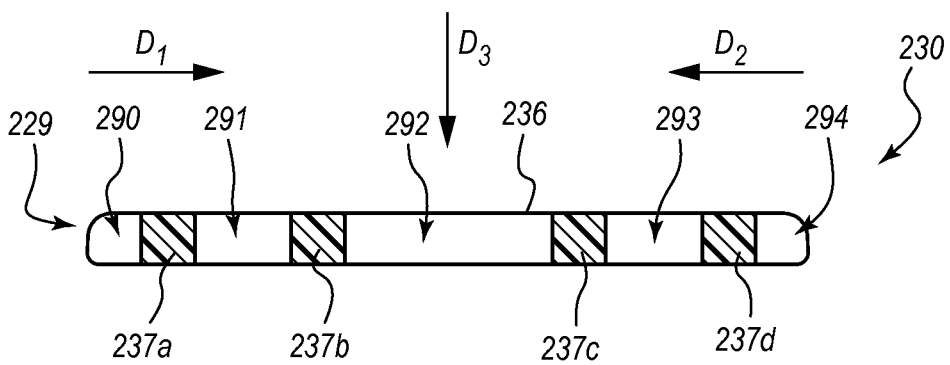
FIG. 10 is a cross-sectional view of another embodiment of a tear seam.
Figure 11:
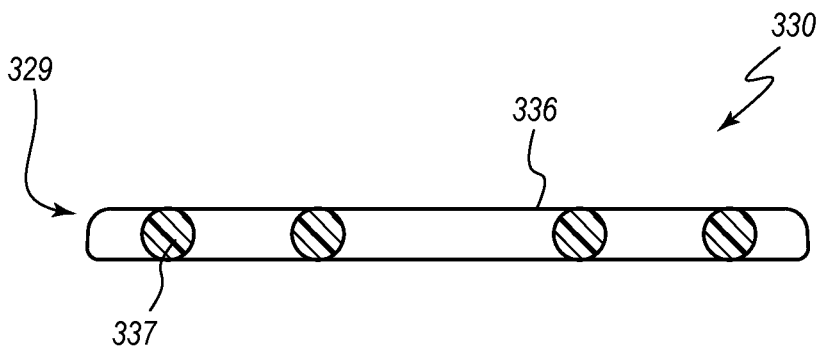
FIG. 11 is a cross-sectional view of yet another embodiment of a tear seam.

FIGS. 9-11 are cross-sectional views of different embodiments of tear seams 129, 229, 329 which can attach various embodiments of tear tabs 136, 236, 336 to neighboring portions of covers 130, 230, 330, respectively. Each tear seam 129, 229, 329 includes discrete break columns 137, 237, 337 that are attached to the tear tabs 136, 236, 336, respectively. In each of FIGS. 9-11, the cross-sectional view provided is that of a plane that is perpendicular to a longitudinal axis (e.g., an axis extending into and out of the page) of each of the break columns 137, 237, 337. In each of FIGS. 9-11, the tear tabs 136, 236, 336 are attached to the respective covers 130, 230, 330 via four break columns 137, 237, 337.

In FIG. 9, the cross-sectional shape of each break column 137a, 137b, 137c, 137d is substantially triangular. However, the outermost break columns 137a, 137d have rounded outer edges, and thus differ in shape from the substantially isosceles triangular break columns 137b, 137c. Further, the outer edges of the break columns 137a, 137d are flush with the outer edges of the tear tab 136, and thus reinforce the outer edge region or otherwise avoiding force risers or regions at which forces can concentrate, thereby making it more difficult to initiate a tear at either of the outer edges that progresses inwardly in either of the inward directions $D_1$, $D_2$. The difference in shapes between the inner and outer break columns 137 can similarly affect tear characteristics of the tear seam 129. For example, in the illustrated embodiment, the outer break columns 137a, 137d can be more resistant to tearing forces acting on the portion of the cover 130 to which the tear tab 136 is attached in either of the inward directions $D_1$, $D_2$, which are perpendicular to the longitudinal axes of the break columns 137, as the rounded edges may distribute the tearing forces more readily than would an angled point at which the forces could be concentrated to initiate tearing. Further, the outermost pairs of break columns 137a, 137b and 137c, 137d are closer to each other than are the central pair of break columns 137b, 137c. Such an arrangement can likewise inhibit tearing that would initiate at the outer edges of the tear seam 129, as the outer edges have greater reinforcement by the outer pairings of break columns 137. As previously discussed, each of the openings 191, 192, 193 can extend through an entirety of the thickness of the cover 130.

The break columns 137 are configured to break more readily when forces on the portion of the cover 130 to which the tear tab 136 is attached are exerted in a third direction $D_3$, as the forces can be concentrated on the upper points of each break column 137a, 137b, 137c, 137d. As can be appreciated from FIG. 8A, the force F provided by an inflating airbag cushion 110 can provide a component of breaking force in the third direction $D_3$. In view of the foregoing, the tear tabs 137 can be configured to tear in a specific manner. For example, the tear seam 129 can be configured to rupture along the direction $D_3$ rather than along other of the directions $D_1$, $D_2$. As can be appreciated from the foregoing, in embodiments of the airbag assembly 100 where each of the tear tabs 136 is configured identically to the tear tab 136 depicted in FIG. 9, the cover 130 can permit the airbag cushion 110 to fill relatively evenly along a longitudinal length of the housing 120. That is, rotational forces that might be imparted to each tear tab 136 due to initially uneven inflation of the airbag cushion 110 along the longitudinal length of the housing 120, which forces might have components in the directions $D_1$, $D_2$, can be counteracted by the outer break columns 137a, 137d, as well as the outer pairings of break columns 137a, 137b and 137c, 137d. However, once sufficient pressure builds within the airbag cushion 110 along a full longitudinal length of the housing, all five tear tabs 136 may, in some embodiments, rupture simultaneously as sufficient forces are provided to each tear tab 136 in the direction $D_3$. Other suitable deployment characteristics may be achieved by altering various characteristics of the break columns 137, as discussed further below. Moreover, in some embodiments, one or more of the tear tabs 136 may be configured differently from neighboring tear tabs 136.

FIG. 10 illustrates another embodiment of a tear seam 229. Unlike the tear seam 129, in some embodiments, the tear seam 229 may broken with about the same amount of ease in either of the directions $D_1$, $D_2$, as compared with the direction $D_3$. The cross-sectional shape of each break column 237a, 237b, 237c, 237d is substantially square, and thus a roughly equivalent flat face of each break column 237 faces each of the directions $D_1$, $D_2$, $D_3$. Further, the outermost break columns 237a, 237d are inset relative to the outermost edges of the tear tab 236. That is, initiation gaps or openings 290, 294 are provided at either side of the tear seam 229. The tear seam 229 can include openings 291, 292, 293 similar to the openings 191, 192, 193 described above. Each opening 291, 292, 293 extends through a full thickness of the cover 230 and is devoid of cover material.

FIG. 11 illustrates another embodiment of a tear seam 329 that closely resembles the tear seam 229, except that the cross-sectional shape of the break columns 337 is circular. Depending on thickness, length, and/or other properties of the break columns 337, as compared with the break columns 227, the tear seam 329 may have the same or a different rupture strength than that of the tear seam 229.

The cross-sectional shape of the break columns 137, 237, 337 may be selected from any desired shape, such as triangular, square, rectangular, circular, trapezoidal, etc. The spacing, height, width, and cross-sectional size, shape, and area of the break columns 137, 237, 337 may be modified to adjust and control the tensile strength, sheer strength, and/or peel strength of the tear seams 129, 229, 329. For example, one or more break columns 137, 237, 337 with larger cross-sectional area may require more force from the inflating airbag to separate the tear tab 136, 236, 336 from the cover 130, 230, 330. Alternatively, one or more break columns 137, 237, 337 with smaller cross-sectional area may require less force from the inflating airbag to separate the tear tab 136, 236, 336 from the cover 130, 230, 330. Additionally, one or more break columns 137, 237, 337 may be designed with a different cross-sectional shape, such as a triangular, a square, or a circular cross-sectional shape, to control the tensile strength, sheer strength and peel strength of the break columns 137, 237, 337. In further embodiments, the cross-sectional shape and/or orientation of the break columns 137, 237, 337 may be used to control the tearing and separation of the tear tabs 136, 236, 336 from the cover 130, 230, 330 in any suitable manner, such as, for example, those discussed above.

Figure 12:
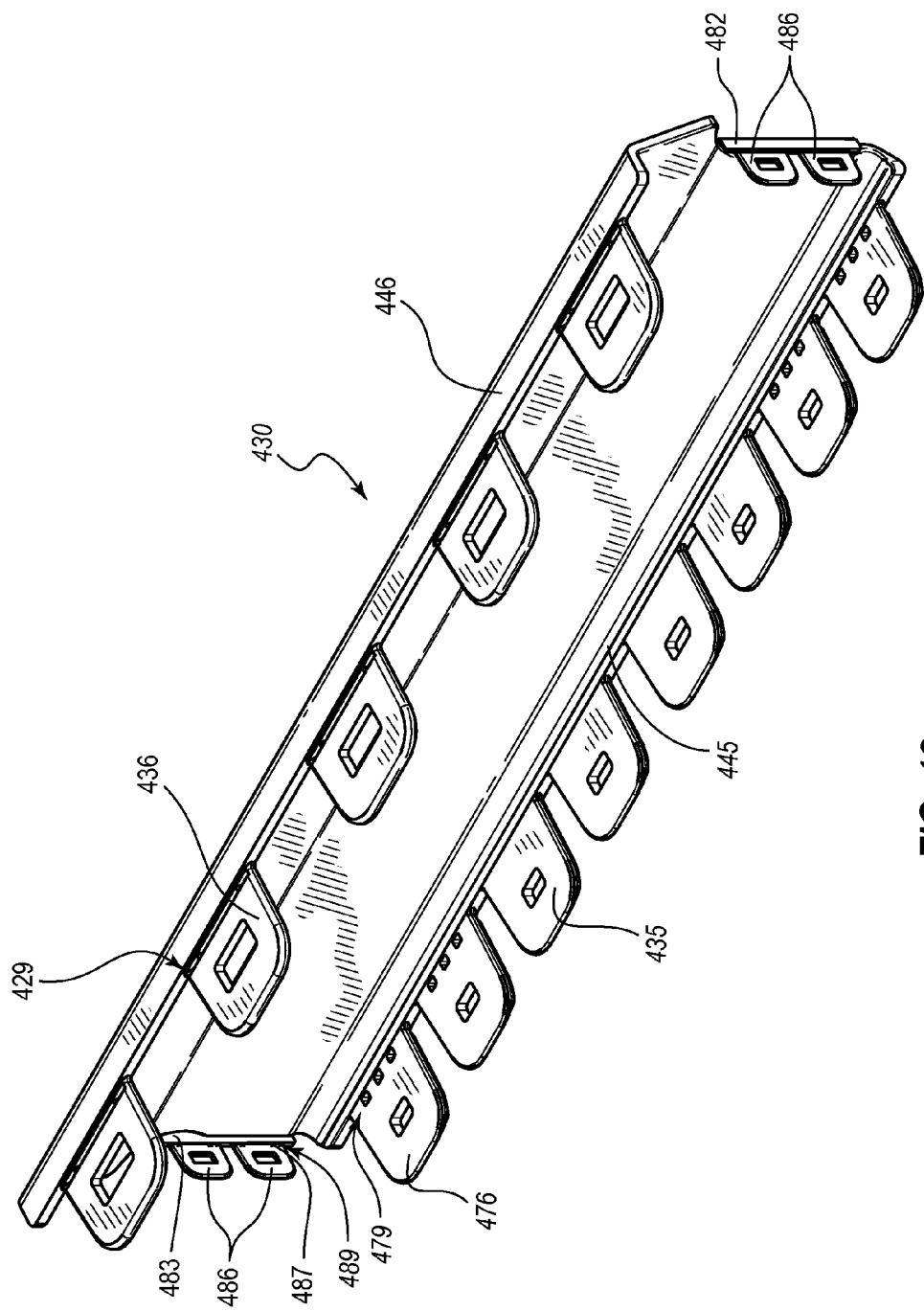
FIG. 12 is a perspective view of an exterior surface of another embodiment of a cover that is similar to the cover of FIGS. 6 and 7.

FIG. 12 illustrates another embodiment of a cover 430 that resembles the cover 130 discussed above in many respects. For example, the cover 430 includes tear tabs 436 (such as the tear tabs 136) that are attached to an end cap 446 of the cover 430. Similarly, the cover 430 includes tear tabs 476 and attachment tabs 435 that are secured to an end cap 445 in manners such as the tear tabs 176 and attachment tabs 436 discussed above.

The cover 430 further includes end caps 482, 483 at opposite laterally extending ends of the cover 430. Tear tabs 486 are attached to the end caps 482, 483 via tear seams 489 that have break columns 487. The tear tabs 486 are configured to couple the lateral sides of the cover 430 to an airbag housing in manners such as discussed above with respect to the tear tabs 436.

Figure 13:
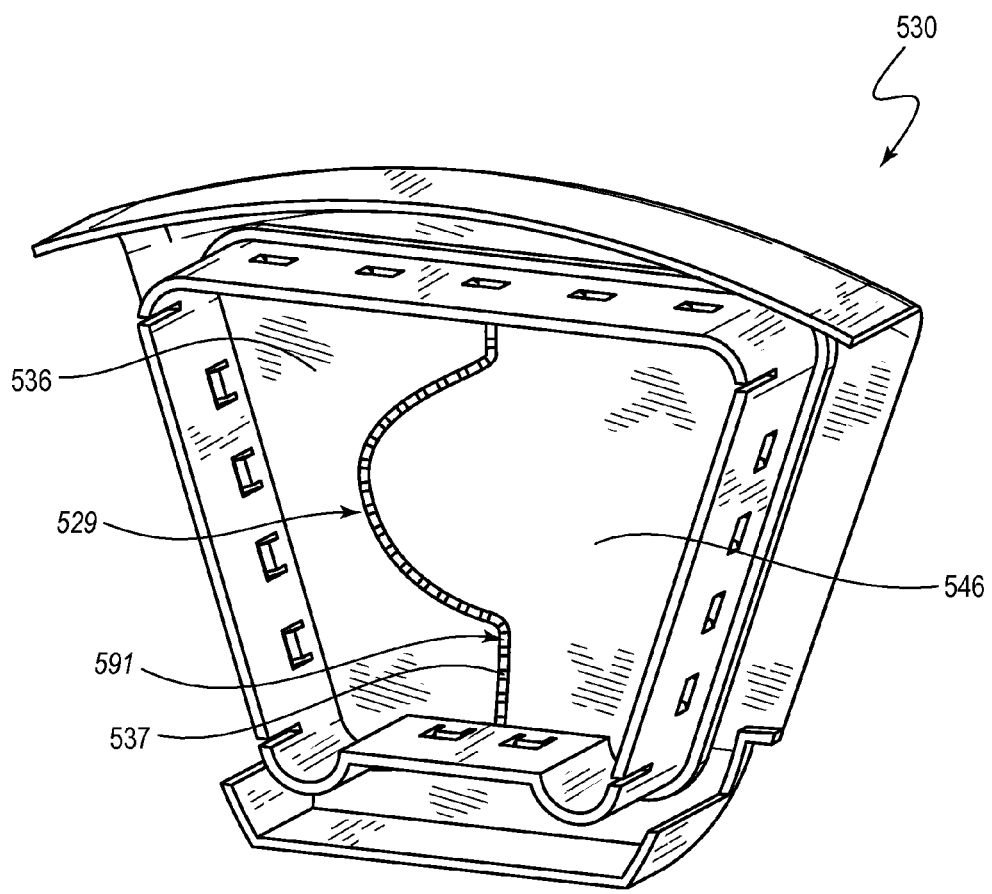
FIG. 13 is a plan view of another embodiment of an airbag assembly cover that includes a tear seam having break columns.

FIG. 13 illustrates another embodiment of cover 530 that can be used with any suitable airbag assembly, such as an assembly for a driver airbag, passenger airbag, side airbag, etc. In the illustrated embodiment, the cover 530 is configured for use with a driver airbag assembly. The cover 530 includes two flaps 536, 546 that are joined to each other via a tear seam 529. The tear seam 529 includes break columns 537 such as any of the break columns discussed above. Each break columns 537 can extend along an individual longitudinal axis that extends between the flaps 536, 546, which are neighboring portions of the cover 530. Adjacent break columns 537 can be isolated from each other via an opening 591 that extends through a full thickness of the cover 530, and thus the tear seam 529 can include a plurality of such openings 591. Upon airbag deployment, the tear seam 529 can break to permit neighboring flaps 536, 546 to move apart to permit passage of the airbag through the cover 530.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An airbag assembly comprising:
   a housing;
   an inflatable airbag cushion positioned within the housing;
   an inflator coupled to the inflatable airbag cushion; and
   a cover attached to the housing, wherein the cover comprises a first tear tab, a first break column, and a second break column, wherein the first and second break columns secure the tear tab to a neighboring portion of the cover, wherein the first and second break columns are separated from each other by an opening that extends through a full thickness of the cover, and wherein the first break column is configured to distribute directional forces differently from the second break column to control separation of the first tear tab from the neighboring portion of the cover during deployment of the airbag cushion.

2. The airbag assembly of claim 1, wherein each break column extends from the tear tab to the cover along a longitudinal axis, and wherein a cross-sectional shape of each break column along a plane that is perpendicular to the longitudinal axis of the break column is generally triangular, circular, or trapezoidal.

3. The airbag assembly of claim 1, wherein the cover comprises additional break columns that secure the tear tab to the neighboring portion of the cover.

4. The airbag assembly of claim 1, wherein the tear tab is fixedly secured to the housing, wherein the break columns are configured to break during deployment of the airbag to separate the tear tab from the neighboring portion of the cover, and wherein the tear tab is configured to remain secured to the housing after deployment of the airbag.

5. The airbag assembly of claim 1, wherein each break column extends from the tear tab to the cover along a longitudinal axis, and wherein a cross-sectional shape of the first break column along a plane that is perpendicular to the longitudinal axis of the first break column is different from a cross-sectional shape of the second break column along a plane that is perpendicular to the longitudinal axis of the second break column.

6. The airbag assembly of claim 1, wherein each break column extends from the tear tab to the cover along a longitudinal axis, and wherein a cross-sectional area of the first break column along a plane that is perpendicular to the longitudinal axis of the first break column is different from a cross-sectional area of the second break column along a plane that is perpendicular to the longitudinal axis of the second break column.

7. The airbag assembly of claim 1, wherein the first break column requires application thereto of a greater amount of force in order to rupture, as compared with an amount of force required to rupture the second break column.

8. The airbag assembly of claim 1, wherein the cover comprises:
   a plurality of additional first tear tabs, wherein each of the first tear tabs is secured to a neighboring portion of the cover by one or more break columns, and wherein the first tear tabs are at a first end of the cover and are attached to the cover via a first tear seam that comprises the break columns; and
   a second tear tab at a second end of the cover that is opposite the first end, wherein the second tear tab is secured to a neighboring portion of the cover by one or more break columns.

9. The airbag assembly of claim 8, wherein the break columns of the first tear tabs are configured to break when a first force is applied to the cover, wherein the break columns of the second tear tab are configured to break when a second force is applied to the cover, and wherein a magnitude of the second force is greater than a magnitude of the first force.

10. The airbag assembly of claim 1, wherein the cover comprises a unitary piece of material, and wherein the first and second break columns and the opening between the first and second break columns are formed via a mold.

11. The airbag assembly of claim 1, wherein the cover comprises a unitary piece of extruded plastic.

12. A cover for an airbag assembly, the cover comprising:
   a central portion configured to cover an opening defined by a housing when the cover is coupled to the housing;
   a tear tab configured to be fixedly secured to the housing; and
   a plurality of discrete break columns that secure the tear tab to the central portion of the cover, wherein adjacent break columns are separated from each other by an opening that extends through a full thickness of the cover, and wherein each of one or more of the plurality of break columns:
      extends in a longitudinal direction;
      is resistant to tearing in a first direction that is perpendicular to the longitudinal direction; and
      is susceptible to tearing in a second direction that is perpendicular to the longitudinal direction.

13. The airbag assembly of claim 12, wherein each break column extends from the first tear tab to the cover along a longitudinal axis, and wherein a cross-sectional shape of each break column along a plane that is perpendicular to the longitudinal axis of the break column is generally triangular, circular, or trapezoidal.

14. The airbag assembly of claim 12, wherein the tear tab is fixedly secured to the housing, wherein the break columns are configured to break during deployment of the airbag to separate the tear tab from the neighboring portion of the cover, and wherein the tear tab is configured to remain secured to the housing after deployment of the airbag.

15. The airbag assembly of claim 12, wherein each break column extends from the tear tab to the cover along a longitudinal axis, and wherein a cross-sectional shape of a first of the plurality of break columns along a plane that is perpendicular to the longitudinal axis of the first break column is different from a cross-sectional shape of a second of the plurality of break columns along a plane that is perpendicular to the longitudinal axis of the second break column.

16. The airbag assembly of claim 12, wherein each break column extends from the tear tab to the cover along a longitudinal axis, and wherein a cross-sectional area of a first of the plurality of break columns along a plane that is perpendicular to the longitudinal axis of the first break column is different from a cross-sectional area of a second of the plurality of break columns along a plane that is perpendicular to the longitudinal axis of the second break column.

17. The airbag assembly of claim 12, wherein a first of the plurality of break columns requires application thereto of a greater amount of force in order to rupture, as compared with an amount of force required to rupture a second of the plurality of break columns.

18. The airbag assembly of claim 12, wherein the cover comprises a unitary piece of extruded plastic.

19. An airbag assembly comprising:
a housing;
an inflatable airbag cushion positioned within the housing;
an inflator coupled to the inflatable airbag cushion; and
a cover attached to the housing, wherein the cover comprises:
a first tear tab and a pair of discrete break columns, wherein the break columns secure the tear tab to a first portion of the cover, and wherein the break columns are separated from each other by an opening that extends through a full thickness of the cover; and
a second tear tab secured to a second portion of the cover by one or more discrete break columns,
wherein the break columns of the first tear tabs are configured to break when a first force is applied to the cover, wherein the break columns of the second tear tab are configured to break when a second force is applied to the cover, and wherein a magnitude of the second force is greater than a magnitude of the first force.

20. The airbag assembly of claim 19, wherein the break columns are configured to break during deployment of the airbag to separate the first and second tear tabs from the first and second portions of the cover, respectively, and wherein the first and second tear tabs are configured to remain secured to the housing after deployment of the airbag.

21. An airbag assembly comprising:
a housing;
an inflatable airbag cushion positioned within the housing;
an inflator coupled to the inflatable airbag cushion; and
a cover attached to the housing, wherein the cover comprises a first tear tab, a first break column, and a second break column, wherein the first and second break columns secure the tear tab to a neighboring portion of the cover, wherein the first and second break columns are separated from each other by an opening that extends through a full thickness of the cover, and wherein the first break column requires application thereto of a greater amount of force in order to rupture, as compared with an amount of force required to rupture the second break column, to control separation of the first tear tab from the neighboring portion of the cover during deployment of the airbag cushion.

22. The airbag assembly of claim 21, wherein each break column extends from the tear tab to the cover along a longitudinal axis, and wherein a cross-sectional shape of the first break column along a plane that is perpendicular to the longitudinal axis is different from a cross-sectional shape of the second break column along the plane.

23. The airbag assembly of claim 21, wherein each break column extends from the tear tab to the cover along a longitudinal axis, and wherein a cross-sectional area of the first break column along a plane that is perpendicular to the longitudinal axis is different from a cross-sectional area of the second break column along the plane.

* * * * *